(12) United States Patent
Tuli

(10) Patent No.: US 7,356,570 B1
(45) Date of Patent: *Apr. 8, 2008

(54) PORTABLE HIGH SPEED COMMUNICATION DEVICE

(75) Inventor: Raja Singh Tuli, Montreal (CA)

(73) Assignee: Raja Tuli, Montreal (CA)

( * ) Notice: Subject to any disclaimer, the term of this patent is extended or adjusted under 35 U.S.C. 154(b) by 657 days.

This patent is subject to a terminal disclaimer.

(21) Appl. No.: 09/650,412

(22) Filed: Aug. 29, 2000

(51) Int. Cl.
*G06F 15/16* (2006.01)
*G06F 17/00* (2006.01)

(52) U.S. Cl. ............ 709/217; 709/246; 715/513; 715/530

(58) Field of Classification Search ......... 715/500, 715/517, 526, 513, 530, 738; 345/864, 760, 345/501; 382/233, 232; 709/236, 247, 219, 709/214, 201, 202, 203, 217, 227, 246
See application file for complete search history.

(56) References Cited

U.S. PATENT DOCUMENTS

| | | |
|---|---|---|
| 4,899,394 A | 2/1990 | Lee |
| 5,161,213 A | 11/1992 | Knowlton |
| 5,355,447 A | 10/1994 | Knowlton |
| 5,379,057 A * | 1/1995 | Clough et al. .......... 345/173 |
| 5,444,763 A | 8/1995 | Lazaridis et al. |
| 5,504,842 A | 4/1996 | Gentile |
| 5,534,893 A | 7/1996 | Hansen, Jr. et al. |
| 5,546,524 A | 8/1996 | Chow et al. |
| 5,546,538 A | 8/1996 | Cobbley et al. |
| 5,555,241 A | 9/1996 | Lazaridis et al. |
| 5,559,800 A | 9/1996 | Mousseau et al. |
| 5,581,243 A * | 12/1996 | Ouellette et al. ........ 345/173 |
| 5,600,790 A | 2/1997 | Barnstijn et al. |
| 5,657,345 A | 8/1997 | Lazaridis |
| 5,682,525 A | 10/1997 | Bouve et al. |
| 5,699,255 A | 12/1997 | Ellis et al. |

(Continued)

FOREIGN PATENT DOCUMENTS

EP  0 833 260  1/1998

(Continued)

OTHER PUBLICATIONS

Spyglass, Concepts and Applications: Spyglass Prism, 1997, Spyglass Inc, pp. 1-8.*

(Continued)

*Primary Examiner*—Paul H. Kang
(74) *Attorney, Agent, or Firm*—Blakely, Sokoloff, Taylor & Zafman LLP

(57) ABSTRACT

A host computer system which receives information, rasterizes it, compresses it and transmits it to a portable device which decompresses the image to display it on a screen. The image can be decompressed in whole or in parts to be viewed as the user scrolls through the image. An electronic touch screen keyboard is featured, which is used to input text characters in a text area on the screen of the device. Thereafter, text is transmitted to specific areas on a virtual browser in the host computer as a string of characters, or individually, with refreshed images of the virtual browser sent back to the device for each transmission. The host computer system is also capable of translating locations on the touch screen of the device into text characters or commands.

81 Claims, 8 Drawing Sheets

U.S. PATENT DOCUMENTS

| | | | |
|---|---|---|---|
| 5,701,451 A | 12/1997 | Rogers et al. | |
| 5,721,908 A | 2/1998 | Lagarde et al. | |
| 5,727,159 A | 3/1998 | Kikinis | |
| 5,758,110 A | 5/1998 | Boss et al. | |
| 5,761,663 A | 6/1998 | Lagarde et al. | |
| 5,764,235 A | 6/1998 | Hunt et al. | |
| 5,765,176 A | 6/1998 | Bloomberg | |
| 5,768,483 A | 6/1998 | Maniwa et al. | |
| 5,774,126 A | 6/1998 | Chaterjee et al. | |
| 5,778,092 A * | 7/1998 | MacLeod et al. | 382/176 |
| 5,793,964 A | 8/1998 | Rogers et al. | |
| 5,802,312 A | 9/1998 | Lazaridis et al. | |
| 5,809,415 A | 9/1998 | Rossmann | |
| 5,810,680 A | 9/1998 | Lobb et al. | |
| 5,831,679 A | 11/1998 | Montgomery et al. | |
| 5,838,906 A | 11/1998 | Doyle et al. | |
| 5,845,076 A | 12/1998 | Arakawa | |
| 5,856,827 A | 1/1999 | Sudo | |
| 5,862,348 A | 1/1999 | Pedersen | |
| 5,867,662 A | 2/1999 | Riggs | |
| 5,867,821 A | 2/1999 | Ballantyne et al. | |
| 5,884,014 A | 3/1999 | Huttenlocher et al. | |
| 5,884,056 A | 3/1999 | Steele | |
| 5,893,095 A | 4/1999 | Jain et al. | |
| 5,910,805 A | 6/1999 | Hickey et al. | |
| 5,915,250 A | 6/1999 | Jain et al. | |
| 5,923,736 A | 7/1999 | Shachar | |
| 5,925,103 A | 7/1999 | Magallanes et al. | |
| 5,928,324 A | 7/1999 | Sloan | |
| 5,938,737 A | 8/1999 | Smallcomb et al. | |
| 5,949,412 A | 9/1999 | Huntsman | |
| 5,949,875 A | 9/1999 | Walker et al. | |
| 5,956,716 A | 9/1999 | Kenner et al. | |
| 5,961,586 A | 10/1999 | Pedersen | |
| 5,961,603 A | 10/1999 | Kunkel et al. | |
| 5,966,135 A | 10/1999 | Roy et al. | |
| 5,968,119 A * | 10/1999 | Stedman et al. | 709/219 |
| 5,974,441 A | 10/1999 | Rogers et al. | |
| 5,978,835 A | 11/1999 | Ludwig et al. | |
| 5,987,256 A | 11/1999 | Wu et al. | |
| 5,995,102 A | 11/1999 | Rosen et al. | |
| 5,995,105 A | 11/1999 | Reber et al. | |
| 6,003,065 A | 12/1999 | Yan et al. | |
| 6,006,105 A | 12/1999 | Rostoker et al. | |
| 6,006,231 A | 12/1999 | Popa | |
| 6,006,241 A | 12/1999 | Purnaveja et al. | |
| 6,008,836 A | 12/1999 | Bruck et al. | |
| 6,011,546 A | 1/2000 | Bertram | |
| 6,011,905 A | 1/2000 | Huttenlocher et al. | |
| 6,012,083 A | 1/2000 | Savitzky et al. | |
| 6,012,086 A | 1/2000 | Lowell | |
| 6,014,133 A * | 1/2000 | Yamakado et al. | 345/501 |
| 6,014,694 A | 1/2000 | Aharoni et al. | |
| 6,014,706 A | 1/2000 | Cannon et al. | |
| 6,016,535 A | 1/2000 | Krantz et al. | |
| 6,021,409 A | 2/2000 | Burrows | |
| 6,023,749 A | 2/2000 | Richardson | |
| 6,026,435 A | 2/2000 | Enomoto et al. | |
| 6,034,686 A | 3/2000 | Lamb et al. | |
| 6,035,281 A | 3/2000 | Crosskey et al. | |
| 6,047,047 A | 4/2000 | Aldridge et al. | |
| 6,049,539 A | 4/2000 | Lee et al. | |
| 6,049,821 A | 4/2000 | Theriault et al. | |
| 6,049,831 A * | 4/2000 | Gardell et al. | 709/236 |
| 6,052,130 A | 4/2000 | Bardon et al. | |
| 6,054,985 A | 4/2000 | Morgan et al. | |
| 6,057,857 A | 5/2000 | Bloomfield | |
| 6,065,057 A | 5/2000 | Rosen et al. | |
| 6,065,800 A | 5/2000 | Olson | |
| 6,067,571 A | 5/2000 | Igarashi et al. | |
| 6,072,483 A | 6/2000 | Rosin et al. | |
| 6,072,598 A | 6/2000 | Tso | |
| 6,073,168 A | 6/2000 | Mighdoll et al. | |
| 6,073,483 A | 6/2000 | Nitecki et al. | |
| 6,081,623 A | 6/2000 | Bloomfield et al. | |
| 6,084,584 A * | 7/2000 | Nahi et al. | 345/864 |
| 6,087,952 A | 7/2000 | Prabhakaran | |
| 6,092,107 A | 7/2000 | Eleftheriadis et al. | |
| 6,097,352 A | 8/2000 | Zavracky et al. | |
| 6,101,180 A | 8/2000 | Donahue et al. | |
| 6,104,392 A | 8/2000 | Shaw et al. | |
| 6,105,021 A | 8/2000 | Berstis | |
| 6,108,655 A | 8/2000 | Schleimer et al. | |
| 6,108,727 A | 8/2000 | Boals et al. | |
| 6,118,449 A | 9/2000 | Rosen et al. | |
| 6,118,899 A | 9/2000 | Bloomfield et al. | |
| 6,119,135 A | 9/2000 | Helfman | |
| 6,121,970 A | 9/2000 | Guedalia | |
| 6,125,209 A * | 9/2000 | Dorricott | 382/233 |
| 6,138,156 A | 10/2000 | Fletcher et al. | |
| 6,157,935 A | 12/2000 | Tran et al. | |
| 6,182,054 B1 | 1/2001 | Dickinson et al. | |
| 6,182,127 B1 * | 1/2001 | Cronin et al. | 709/219 |
| 6,185,625 B1 * | 2/2001 | Tso et al. | 709/247 |
| 6,192,393 B1 | 2/2001 | Tarantino et al. | |
| 6,195,667 B1 | 2/2001 | Duga et al. | |
| 6,201,611 B1 | 3/2001 | Carter et al. | |
| 6,219,465 B1 | 4/2001 | Nacman et al. | |
| 6,226,400 B1 | 5/2001 | Doll | |
| 6,233,541 B1 | 5/2001 | Butts et al. | |
| 6,243,761 B1 | 6/2001 | Mogul et al. | |
| 6,256,750 B1 | 7/2001 | Takeda | |
| 6,262,732 B1 | 7/2001 | Coleman et al. | |
| 6,263,347 B1 | 7/2001 | Kobayashi et al. | |
| 6,269,481 B1 | 7/2001 | Perlman et al. | |
| 6,272,332 B1 | 8/2001 | Matsumoto et al. | |
| 6,282,294 B1 | 8/2001 | Deo et al. | |
| 6,285,461 B1 | 9/2001 | Fujii et al. | |
| 6,286,003 B1 | 9/2001 | Muta | |
| 6,295,059 B1 | 9/2001 | Lentz et al. | |
| 6,298,162 B1 | 10/2001 | Sutha et al. | |
| 6,300,959 B1 | 10/2001 | Gabler et al. | |
| 6,304,928 B1 | 10/2001 | Mairs et al. | |
| 6,311,058 B1 | 10/2001 | Wecker et al. | |
| 6,313,880 B1 | 11/2001 | Smyers et al. | |
| 6,317,781 B1 | 11/2001 | De Boor et al. | |
| 6,345,279 B1 | 2/2002 | Li et al. | |
| 6,356,283 B1 * | 3/2002 | Guedalia | 345/760 |
| 6,359,603 B1 | 3/2002 | Zwern | |
| 6,404,416 B1 | 6/2002 | Kahn et al. | |
| 6,411,275 B1 | 6/2002 | Hedberg | |
| 6,418,310 B1 | 7/2002 | Dent | |
| 6,421,716 B1 | 7/2002 | Eldridge et al. | |
| 6,424,369 B1 | 7/2002 | Adair | |
| 6,433,801 B1 | 8/2002 | Moon et al. | |
| 6,449,639 B1 | 9/2002 | Blumberg | |
| 6,466,198 B1 | 10/2002 | Feinstein | |
| 6,466,203 B2 | 10/2002 | Van Ee | |
| 6,473,097 B1 | 10/2002 | Elliott | |
| 6,477,143 B1 | 11/2002 | Ginossar | |
| 6,480,710 B1 | 11/2002 | Laybourn et al. | |
| 6,487,597 B1 | 11/2002 | Horie et al. | |
| 6,535,743 B1 | 3/2003 | Kennedy, III et al. | |
| 6,536,043 B1 | 3/2003 | Guedalia | |
| 6,539,077 B1 | 3/2003 | Ranalli et al. | |
| 6,544,295 B1 | 4/2003 | Bodnar | |
| 6,553,240 B1 | 4/2003 | Dervarics | |
| 6,553,412 B1 | 4/2003 | Kloba et al. | |
| 6,560,621 B2 | 5/2003 | Barile | |
| 6,564,250 B1 | 5/2003 | Nguyen | |
| 6,565,611 B1 | 5/2003 | Wilcox et al. | |
| 6,571,245 B2 | 5/2003 | Huang et al. | |
| 6,574,501 B2 | 6/2003 | Lambert et al. | |
| 6,587,583 B1 | 7/2003 | Kurzweil et al. | |

| | | | |
|---|---|---|---|
| 6,598,087 B1 | 7/2003 | Dixon, III et al. | |
| 6,603,469 B1 | 8/2003 | Gettemy et al. | |
| 6,604,106 B1 | 8/2003 | Bodin et al. | |
| 6,615,234 B1 | 9/2003 | Adamske et al. | |
| 6,628,243 B1 | 9/2003 | Lyons et al. | |
| 6,631,247 B1 | 10/2003 | Motoyama et al. | |
| 6,633,314 B1 | 10/2003 | Tuli | |
| 6,646,759 B1 | 11/2003 | Koga | |
| 6,654,814 B1 | 11/2003 | Britton et al. | |
| 6,674,445 B1 | 1/2004 | Chithambaram et al. | |
| 6,677,965 B1 | 1/2004 | Ullmann et al. | |
| 6,690,403 B1 | 2/2004 | Tuli | |
| 6,704,024 B2 | 3/2004 | Robotham et al. | |
| 6,738,841 B1 * | 5/2004 | Wolff | 709/202 |
| 7,113,638 B2 | 9/2006 | Caruso et al. | |
| 7,143,141 B1 * | 11/2006 | Morgan et al. | 709/217 |
| 2001/0032254 A1 | 10/2001 | Hawkins | |
| 2001/0034770 A1 | 10/2001 | O'Brien | |
| 2001/0047441 A1 | 11/2001 | Robertson | |
| 2001/0052911 A1 | 12/2001 | Boyle et al. | |
| 2002/0015042 A1 * | 2/2002 | Robotham et al. | 345/581 |
| 2002/0018234 A1 | 2/2002 | Fu et al. | |
| 2002/0030843 A1 | 3/2002 | Tuli | |
| 2002/0030844 A1 | 3/2002 | Tuli | |
| 2003/0074672 A1 | 4/2003 | Daniels | |

FOREIGN PATENT DOCUMENTS

| | | |
|---|---|---|
| EP | 0 848 339 A1 * | 6/1998 |
| EP | 0 889 402 A | 1/1999 |
| EP | 0 889 636 A | 1/1999 |
| EP | 890922 A2 | 1/1999 |
| EP | 1 001 613 A | 5/2000 |
| EP | 1026578 A2 | 8/2000 |
| EP | 1043876 A2 | 10/2000 |
| EP | 1109113 A2 | 6/2001 |
| GB | 2347766 A | 9/2000 |
| WO | WO 97 30556 A | 8/1997 |
| WO | WO 97 38389 A | 10/1997 |
| WO | WO 9821671 A1 * | 5/1998 |
| WO | WO 98 40842 A | 9/1998 |
| WO | WO 98 43177 A | 10/1998 |
| WO | WO 99 09658 A | 2/1999 |
| WO | WO 99/48007 | 9/1999 |
| WO | WO 00/18054 A | 3/2000 |
| WO | WO 0033232 A2 | 6/2000 |
| WO | WO 01 09836 A | 2/2001 |
| WO | WO 02/08878 A | 1/2002 |
| WO | WO 02/057951 A | 7/2002 |
| WO | WO 00/18054 A | 3/2003 |

OTHER PUBLICATIONS

International Search Report, PCT/US 01/03382, 1 pages, 2001.
International Search Report, PCT/CA 01/00114, 3 pages, 2001.
International Search Report, PCT/CA 01/00126, 3 pages, 2001.
International Search Report, PCT/CA 01/00170, 4 pages, 2002.
International Search Report, PCT/CA 01/00169, 3 pages, 2002.
International Search Report, PCT/CA 02/00048, 5 pages, 2003.
Tagawa Norio, "Data Relay System and Data Repeater Applied to the System", Patent Abstracts of Japan, vol. 1997, No. 10, Jun. 24, 1997.
Armando Fox et al, "Experience with Top Gun Wingman: a proxy-based graphical web browser fro the 3Com PalmPilot", *Middleware*, IFIP International Conference on Distributed Systems, Platforms and Open Distributed Processing, Sep. 1998, pp. 407-424.
Richard Han, et al., "Dynamic Adaptation in an Image Transcoding Proxy for Mobile Web Browsing", *IEEE Personal Communication*, Dec. 1998, pp. 8-17.
Timothy Bickmore, et al., "Web Page Filtering and Re-Authoring for Mobile Users", *The Computer Journal*, vol. 42, No. 6, 1999.
Tristan Richardson, Quentin Stafford-Fraser, Kenneth R. Wood & Andy Hopper, "Virtual Network Computing", *IEEE Internet Computing*, vol. 2 No. 1, Jan./Feb. 1998 pp. 33-38.
Citrix Systems, Inc.: "Citrix Announces New Product and Product Enhancements that Speed Web Application", http://www.citrix.com/press/news/releases/20000905_product_enhance.asp, Sep. 5, 2000.
Boutell, T. et al., "PNG (Portable Network Graphics) Specification Version 1.0", RFC 2083, pp. 1-102, Mar. 1997.
Halfhill, T.R., "Good-Bye GUI . . . Hello, NUI," BYTE Magazine, www.byte.com, vol. 22, No. 7, pp. 60-64, 66, 68, 70, and 72, Jul. 1997.
Masinter, L., "Returning Values from Forms: multipart/form-data," RFC 2388, pp. 1-9, Aug. 1998.
Jao, C.S. et al., "The display of photographic-quality images on the Web: a comparison of two technologies," IEEE Transactions on Information Technology In Biomediciene, vol. 3, iss. 1, pp. 70-73, Mar. 1999.
Kaljuvee, O. et al., "Efficient Web form entry on PDAs," ACM Proceedings of the tenth International Conference on WWW, ACM Press, ISBN: 1-58113-348-0, pp. 663-672, May 2001.
Selected pages from AT&T Wireless, Bell Atlantic Mobile, and Nextel, as delivered through the Wayback Machine, web.archieve.org.
Lewis, Ted. "Information Appliances: Gadget Netopia" *Computer*, vol. 31, issue 1, Jan. 1998, pp. 59-68.
Cimini, Leonard J., Jr., et al. "Advanced Cellular Internet Service (ACIS)", *IEEE communication Magazine*, vol. 36, Issue 10, Oct. 1998, pp. 150-159.
Oliphant, Malcolm W. "The Mobile Phone Meets the Internet", *IEEE Spectrum*, vol. 36, Issue 8, Aug. 1999, pp. 20-28.
Lind, R., et al. "The Network Vehicle—A Glimpse into the Future of Mobile Multi-Media", *IEEE ASE Systems Magazine*, Sep. 1999, pp. 27-32.
Gbaguidi, Constant, et al. "A programmable Architecture for the Provision of Hybrid Services", *IEEE communications Magazine*, vol. 27, Issue 7, Jul. 1999, pp. 110-116.
Narayanaswamy, Shankar, et al. "User Interface for a PCS Smart Phone", *IEEE Int.. Conference on Multimedia Computing and Systems*, vol. 1 Jun. 1999, pp. 777-781.
Rumba Technical Bulletin, "Configuring RUMBA LPR & LPD (16-bit)," 1996, from the web: 156.27.8.200/ts_rumba/solution/pdf/TCPIP/4002.pdf, pp. 1-11.
International Search Report, PCT/CA 02/00133, 3 pages, 2003.
International Search Report, PCT/CA 02/00048, 3 pages, 2003.
International Search Report, PCT/CA 01/01057, 2 pages, 2003.
Joel F. Bartlett, "Experience with a Wireless World Wide Web Client", Mar. 1995.
Björk et al., "WEST: A Web Browser For Small Terminals", 1999, ACM, CHI Letters, vol. 1, 1, pp. 187-196.

* cited by examiner

PORTABLE HIGH SPEED COMMUNICATION DEVICE

BACKGROUND OF THE INVENTION

1. Field of the Invention

The invention relates to a host computer system, which receives information, rasterizes it, compresses it and transmits it to a portable device which decompresses the image to display it on a screen. The result is a cost effective Internet access solution which allows interaction between the device and a host computer.

2. Description of the Prior Art

The background of the present invention includes U.S. Pat. No. 5,925,103, Internet Access Device, which describes an improved Internet access system, vastly different from the present invention. Other prior art would include palm top computers, hand-held computers and cellular telephones that have limited processing power due to design restrictions. Thus, these computers are much slower for accessing the Internet and World Wide Web.

SUMMARY OF THE INVENTION

The present invention relates to a portable high speed Internet access device that can access the internet and World Wide Web as a wireless device.

A principal embodiment has a Web server connected to the Internet. This server contains a virtual browser which takes the image displayed in the browser and converts this image into a bit map which is compressed, and communicates via telephone lines to a cellular telephone. The cellular telephone is connected to the high speed internet access device of the invention commonly referred to as a PDA (Personal Digital Assistant) which is comprised of a display screen, battery and related micro-electronics. This enables the PDA to receive, decompress and view the bit map image sent from the virtual browser, and more importantly, through cellular phone connectivity to be able to input data from the PDA directly onto the server. In particular, the host computer or server receives vector information or compressed data in the form of HTML, JPEG, etc., which is displayed on a web page. The virtual browser virtually displays a virtual image on the server. That image, in whole or parts, is recompressed and sent to the PDA. The recompressed data format sent to the PDA, is not necessarily in the same format as the compressed data format first received by the server.

Another embodiment of the invention involves the server receiving vector information such as HTML or text and then rasterizing it to bit map format. It can then shown in memory through the virtual browser and is recompressed through a "loss less" method and sent to the PDA.

One embodiment of the invention comprises the PDA with an electronic touch screen keyboard, which remains invisible and only appears on a portion of the display screen when called upon by touching the keyboard icon. The entire display screen is covered with a transparent touch panel, which is essentially a matrix array of electrodes, which can detect the location of any pressure points applied to it. The keyboard disappears when touching a minimizing icon, revealing a refreshed image of the virtual browser. When the user is viewing the image displayed by a virtual browser on the PDA, and a text message needs to be entered at a specific location on the display, the user would have to point to this specific location, and pressing on the display screen's touch panel with a stylus tip, the cursor appears at that exact location, ready to input text. The keyboard would then be activated by pressing on the keyboard icon with a stylus tip, whereby a miniature keyboard layout would appear at the bottom of the display screen, with a portion of the display screen above the keyboard layout reserved to view text messages generated by the user, to be inputted in the image of the virtual browser at a later time. As the user enters text characters by pressing on various locations of the touch panel above the keyboard layout, the text message appears in the area above the keyboard, and when the user is finished inputting text, pressing on the send or return icons would send the entire text message to the specific location on the web page as viewed through the virtual browser on the server. The PDA device translates strokes on the touch panel above the keyboard layout into characters, and the message is sent as a string of characters. A refreshed portion of virtual browser is sent back to the PDA, which displays the specific portion of the virtual browser that text was entered into, to verify that text was inputted at the correct location.

In a further embodiment of the invention, an automatic keyboard feature is available to the user when scrolling through the image of the virtual browser on the PDA, and a text message is to be entered at a specific location. The user would point at the desired location to enter text and a keyboard layout automatically appears ready for text input. As text is typed, the text message appears in the area above the keyboard layout, and after the send or return icons are selected, the keyboard layout disappears and the message is sent to the specific location on the virtual browser.

In another embodiment, which communicates with the virtual browser in a similar fashion, the method of text transfer to the virtual browser is different. The display screen would have the keyboard layout at the bottom, with two smaller areas above, one of which displays text characters comprising the message being typed, and the other area displaying a background portion of the virtual browser. For each text character that is selected and appears in the text area, a message is sent to the virtual browser that tells which character is typed, and that specific text character is entered in the virtual browser in the portion of the image selected for text input. A refreshed portion of virtual browser is sent back to the PDA, which displays the specific portion of the virtual browser that text was entered into, to verify that text was inputted at the correct location.

In a further embodiment, which communicates with the virtual browser in a similar fashion, the method of text transfer to the virtual browser is different. The display screen would have the keyboard layout at the bottom, with two smaller areas above, one of which displays text characters comprising the message being typed, and the other area displaying a background portion of the virtual browser. For each text character that is inputted in the text window, a message is sent to the virtual browser informing of the specific matrix location selected on the keyboard window. This matrix location is translated at the server end to determine what character is selected as the mapped layout of each character on the PDA keyboard is known, and this character entered in the virtual browser at the specific location selected. A refreshed portion of virtual browser is sent back to the PDA, which displays the specific portion of the virtual browser that text was entered into, to verify that text was inputted at the correct location.

In another embodiment of the invention, an external keyboard is featured which is used to enter text characters as required. The keyboard interface can be wired or wireless. When the user wishes to enter text in the virtual browser, the specific location is selected by pressing on the touch panel and a text window appears in a portion of the display screen ready for text input. The keyboard connected to the PDA is then used to input text, and when the enter key is pressed, the message gets sent and the text window disappears. The text message is entered in the virtual browser at the specific location selected. A refreshed portion of virtual browser is sent back to the PDA, which displays the specific portion of the virtual browser that text was entered into, to verify that text was inputted at the correct location.

In other embodiments of the invention, the image displayed in the virtual browser is compressed at the server in various amounts by different methods before sending to the PDA device.

Different parts of the image are compressed in different ways. Parts of the image that is text image are compressed by G4 compression techniques. Other parts of the image containing pictures are compressed by JPEG compression techniques. The entire image is converted to a raster image but different parts are converted at different depths of color. Text portions can be compressed by "loss less" techniques, which will result in complete image reproduction with no errors in text upon decompression, whereas pictures can be compressed by "lossy" techniques which upon decompression give a slightly degraded image quality for each compression. An image with black and white text and color graphics portions would be converted to a raster image, but only the text part of it reduced to black and white 1 bit and other graphics parts to 24 bit or other color raster images. Hence different parts of the image can be converted or reduced to different depths of color to resemble an actual web page with picture in color and text in black and white. The depths of color can be set by the user depending on the quality of image required, which affects the speed of refreshing the screen which also depends on the amount of graphics displayed. Text and pictures from a web page would get compressed separately at the server and then sent to the PDA. In the PDA, text or black and white portions of the image get decompressed first and displayed on the screen. Color portions get decompressed and are overlain in the image on the screen shortly after, enabling the user to view black and white portions of the image in advance.

A further embodiment would take the entire image to be viewed including all text and pictures and convert it to 1 bit raster. This file is compressed by G4 or other loss less compatible methods and sent to the PDA. When received by the PDA, this file is decompressed for the user to view the image, and the black and white portions are displayed first which can be done quickly and the graphics portions are overlaid progressively with color. This enables an image to be viewed quickly without the fine details of graphics, which follow moments after.

BRIEF DESCRIPTION OF THE DRAWINGS

The invention is described in more detail below with respect to an illustrative embodiment shown in the accompanying drawings in which.

DETAILED DESCRIPTION OF THE PREFERRED EMBODIMENTS

To facilitate description, any numeral identifying an element in one figure will represent the same element in any other figure.

The principal embodiment of the present invention aims to provide a device that allows a user to access the Internet or the World Wide Web (WWW), which is a device similar to a palm top computer. It is a further aim of the present invention, to offer a cost-competitive device. It is a further aim of the present invention, to increase the speed of refreshing the screen when the user clicks on a link and commands another page to be displayed.

Currently, existing palm top devices such as the Palm Pilot VII and Windows CE type devices contain an operating system, and within the operating system a mini-browser to interpret information received from the WWW or Internet and then display this information on the screen. This requires a powerful microprocessor, which is not advantageous in conserving power for portable applications and also minimizing costs.

With reference to application Ser. Nos. 09/496,172, 09/501,585, 09/504,809, 09/504,808 and 09/504,807 whose embodiments are incorporated herein, the present invention discloses a method and system of storing previously viewed pages on the device. Thus a user is able to utilize a pointer or stylus tip to select and press a "back" button or a "forward" button to view previously accessed pages, and which pages are stored directly in the device. The invention further discloses a method of enabling the used to scroll to a specific area thereby initiating downloading in that area, or by the user clicking on a specific area to initiate the downloading.

Figure 1:
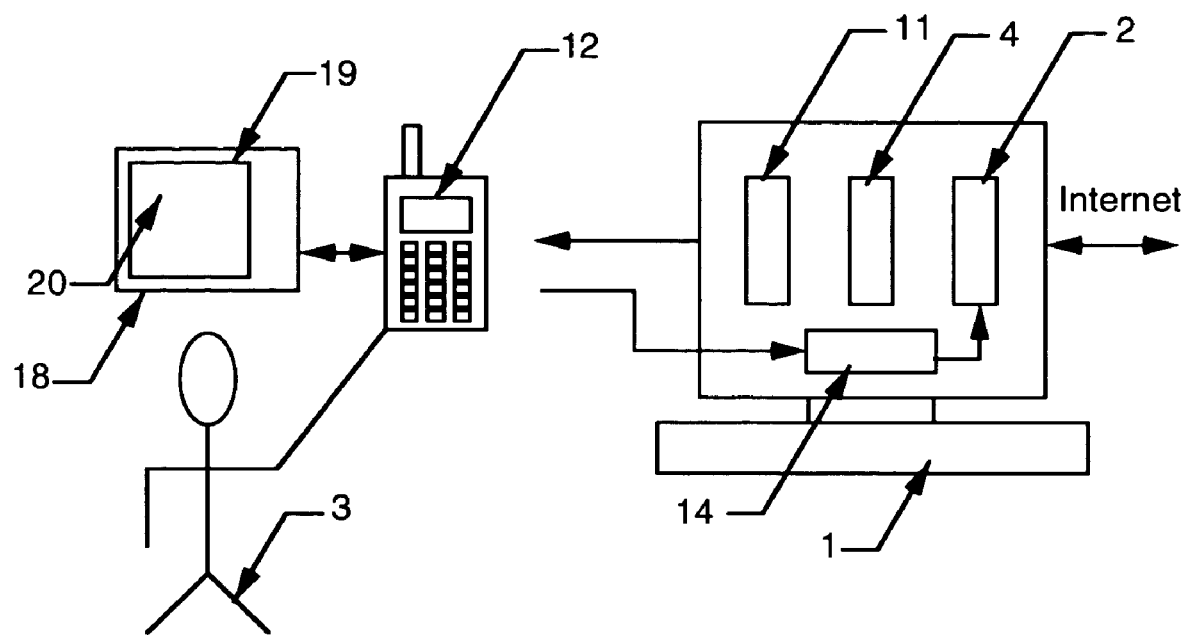
FIG. 1 illustrates elements in the host computer, which communicates with a remote user and the device of the invention.
Figure 2:
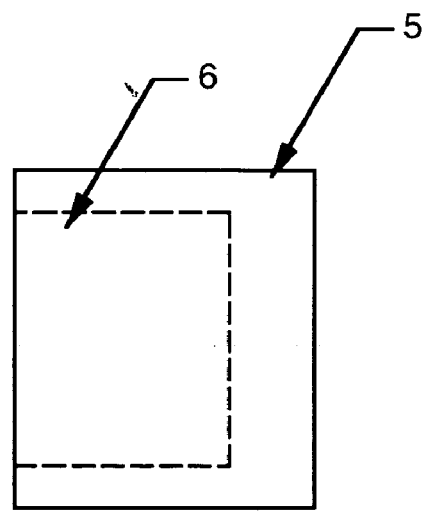
FIG. 2 illustrates the image to be displayed compared with the displayable area of a browser window.
Figure 4:
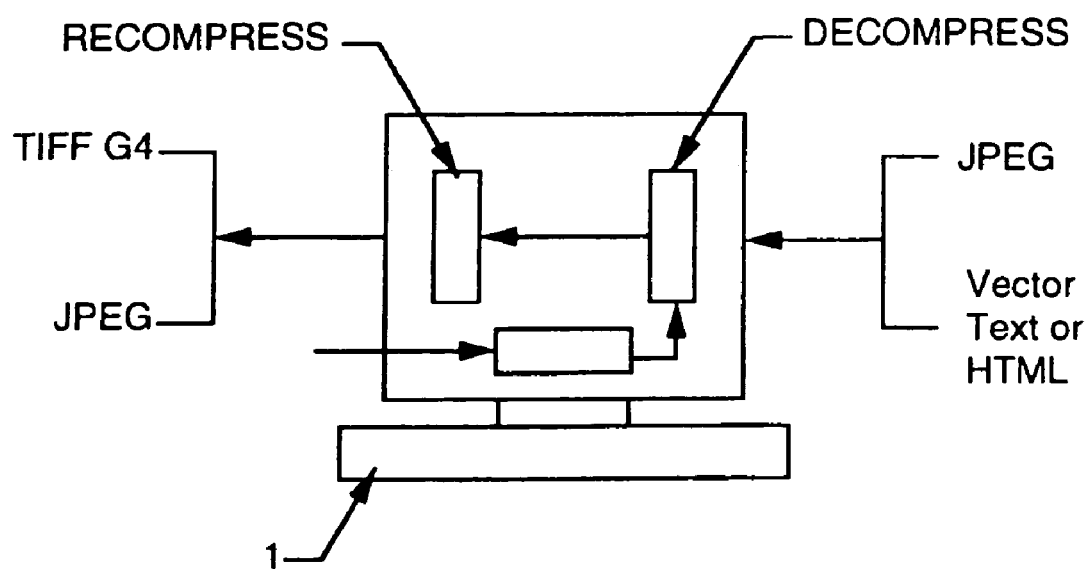
FIG. 4 illustrates file formats received and sent by the host computer.

The principal embodiment of the present invention is disclosed in FIG. 1. A host computer 1 is depicted which is connected to the Internet, and that host may also be a Web server. Running in the host computer, is a Web server program 2. When a remote user 3 requests to view a Web page (or electronic message etc.) the Web server software receives HTML, JAVA, or other types of information and transmits this information to another software, the Browser Translator 4. This software translates the information, (i.e. the entire image comprising graphics and text) received in the form of HTML, Java, etc. (as information may be gathered from different sources) and translates it to a black and white bit map or raster image. In another embodiment, the software translates the information into a raster or color image. The image 5, as shown in FIG. 2, contains the information that would normally be displayed on a single Web page. The translation program therefore, also acts as a virtual browser 6. As can be seen in FIG. 2, the image 5 to be displayed in a browser window 6 is usually larger than the displayable area of the browser window 6. The cellular telephone 12 of FIG. 1 is connected to the high speed internet access device 18 of the invention commonly referred to as a PDA (Personal Digital Assistant) which is comprised of a display screen 19, battery and related microelectronics. This enables the PDA to receive, decompress and view the bit map image sent from the virtual browser 6, and more importantly, through cellular phone connectivity to be able to input data from the PDA directly onto the server. In particular, the host computer or server receives vector information or compressed data in the form of HTML, JPEG, etc., which is displayed on a web page. The virtual browser virtually displays a virtual image on the server. That image, in whole or parts, is recompressed and sent to the PDA. The recompressed data format sent to the PDA, is not necessarily in the same format as the compressed data format first received by the server 1, as illustrated in FIG. 4. For example, the incoming data from a Web page may be in the form of JPEG which is decompressed and displayed on the virtual browser. This data is recompressed and sent to the PDA but can be in the form of TIFF G4 or other formats, and not necessarily JPEG as initially received.

Another embodiment of the invention involves the server receiving vector information such as HTML or text and then rasterizing it to bit map format. It can then shown in memory through the virtual browser and is recompressed through a "loss less" method and sent to the PDA.

Figure 3:
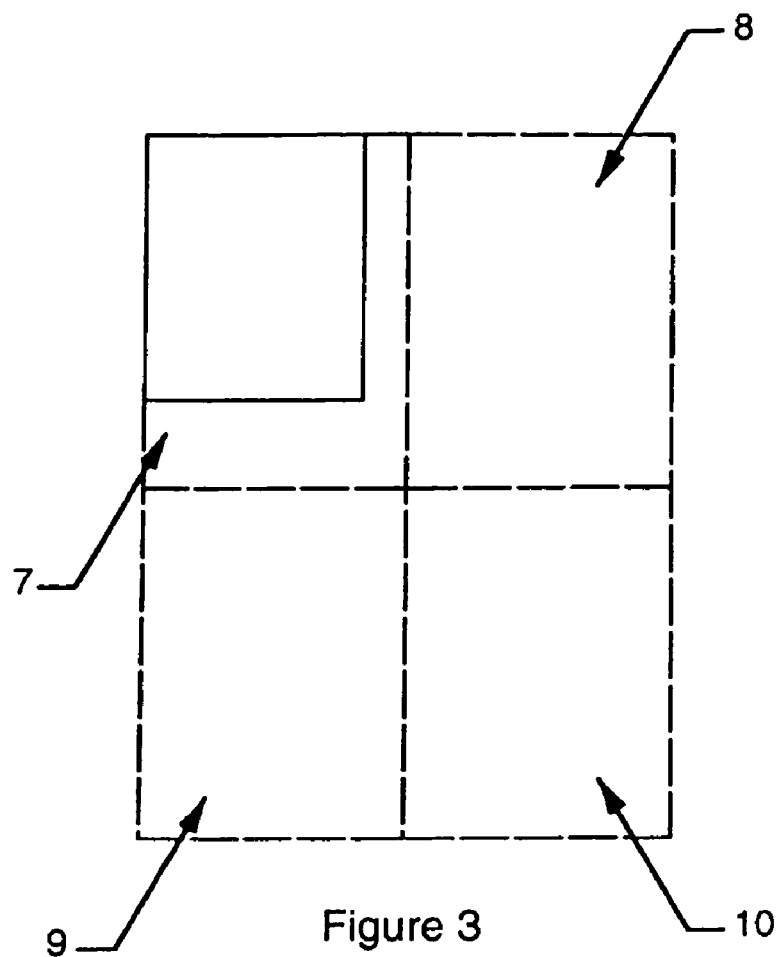
FIG. 3 shows a typical subdivision of the image to be displayed.

The image 5 of FIG. 2 is further divided into sections 7, 8, 9, and 10, as shown in FIG. 3. The image is divided after the bitmap or raster is created. The reason for the division (as will be explained later) is for the purpose of display priority on the user's display. The image 5 is then sent to another program 11 running on the host computer 1 (FIG. 1), which compresses the image using a loss-less compression method. The compression method may be group 3 or group 4, or another method. The programs 4 and 11 can have multiple instances running simultaneously on the host server for the purpose of connecting to multiple users. The compressed image, after being processed by program 11, is sent to the user, using a protocol in which information may be broken down into packets.

Figure 5:
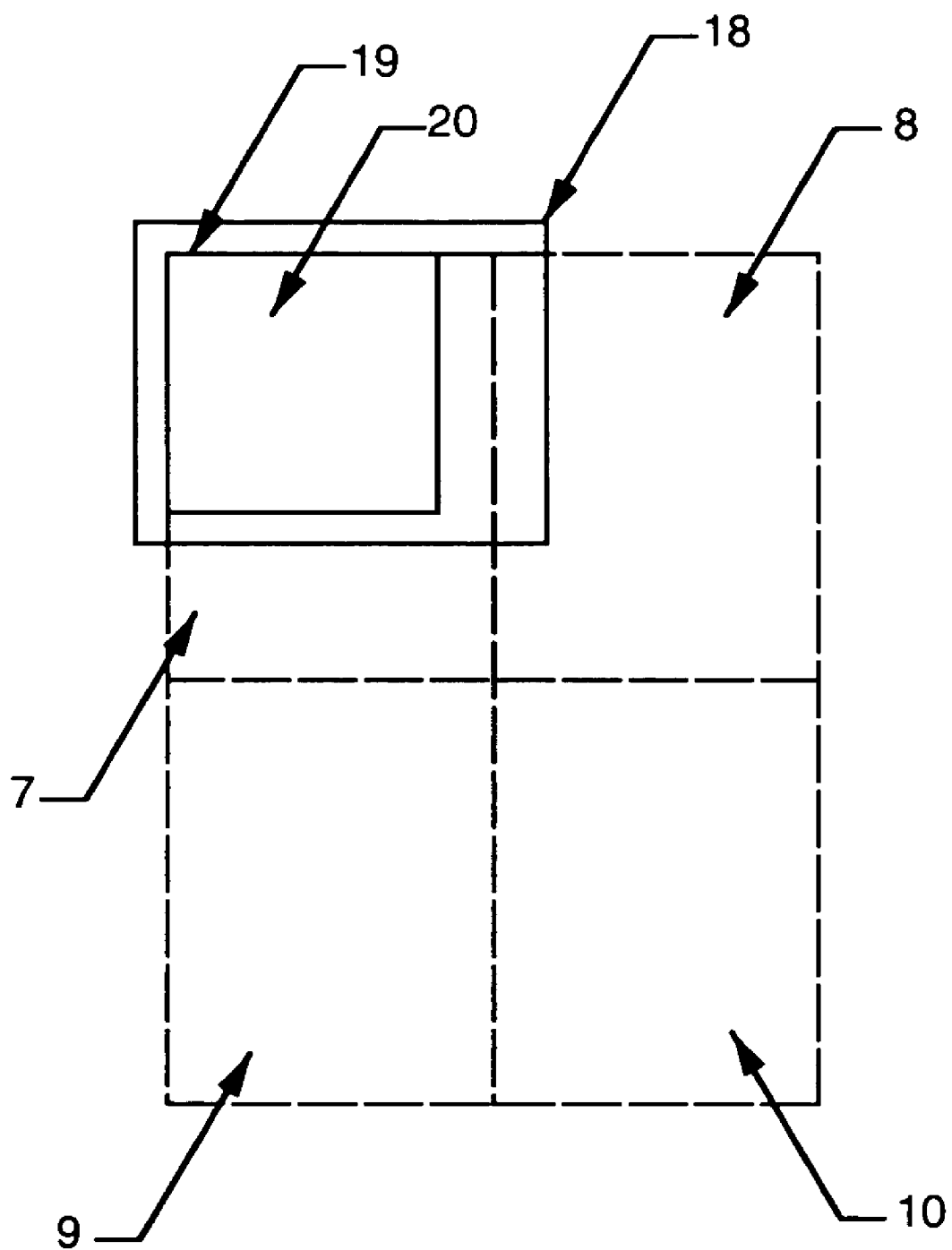
FIG. 5 illustrates the displayable area of the device with respect to portions of the image, which are sequentially decompressed prior to viewing.

The information is received by the device 18 of the invention in FIG. 5 which has the ability to display a monochrome image 20, in its display window 19. The information is decompressed and displayed in the order of priority such that part of image 7 of FIG. 5, which substantially or completely covers the displayable area 19 of the device, is decompressed and displayed first and then sequentially the portions 8, 9 and 10 of the image are decompressed, and stored in an internal memory of the device to be displayed later when the user scrolls up, down, or sideways to these parts of the image.

In a further embodiment, the information received from the server by the device 18 of the invention in FIG. 5 remains compressed, and only the area viewed by the device is decompressed, since the area of a web page to be viewed is larger than the device's display area. As the user scrolls up, down or sideways, only the parts of the image to be displayed are decompressed prior to viewing.

A CPU resident in the device therefore has the ability to decompress a bit map or raster image that may be larger than the size of the display and allow the user to traverse this bit map or raster image. The primary method of traversing the image is through conventional scroll bars positioned at the sides of the image. The resident CPU on the device has no ability to determine which part or parts of the image, that is being displayed, represent links to other Web pages etc. Thus, the translator program 4 (FIG. 1) translates the image in the virtual browser 6 such that the words that represent links on the page 5 (FIG. 2) are translated to be slightly bolder. The user may therefore consider text that is bold to be links.

Figure 6:
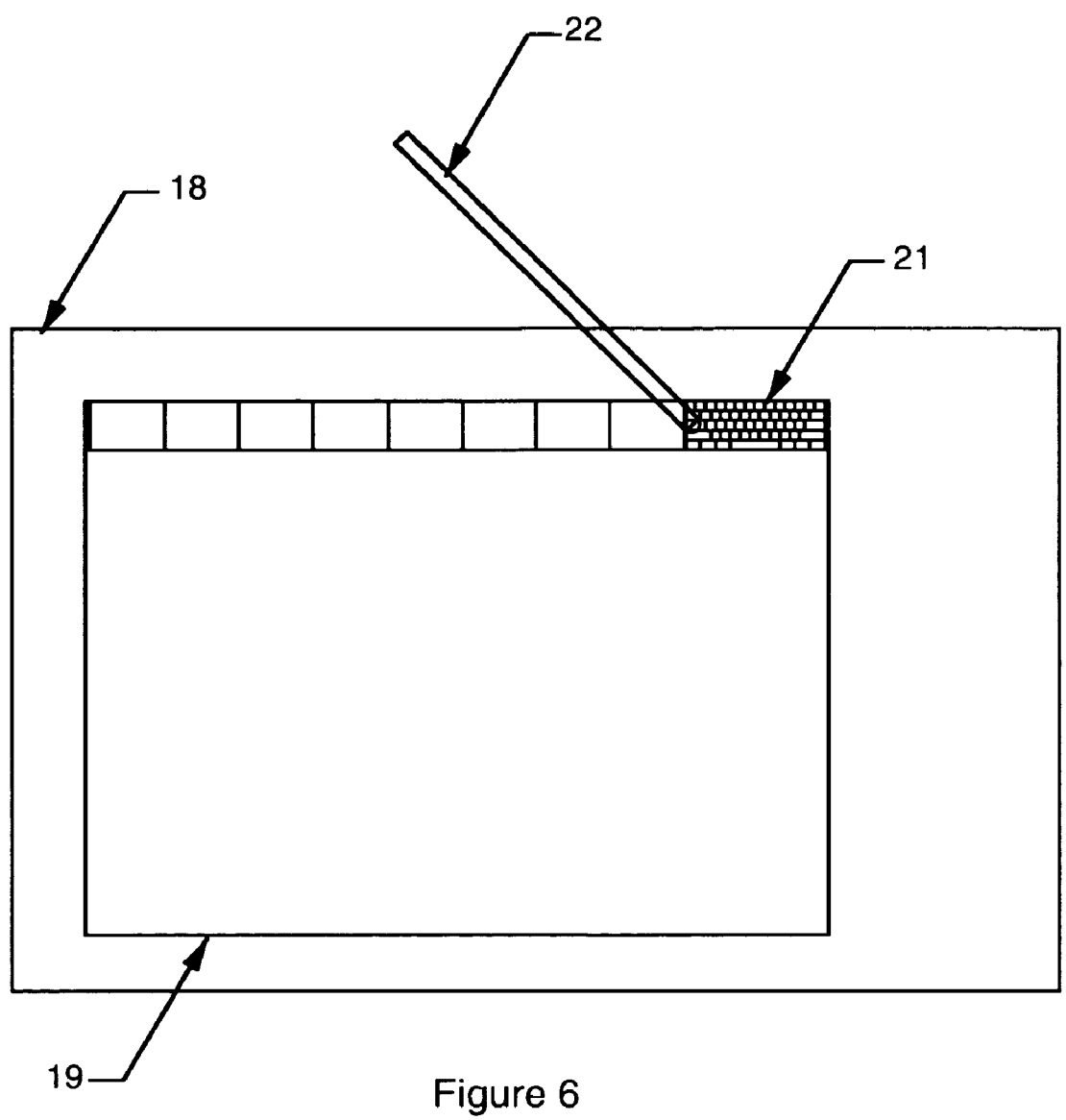
FIG. 6 illustrates the display screen of the device with a stylus tip used to select icons or other elements in the display.
Figure 7:
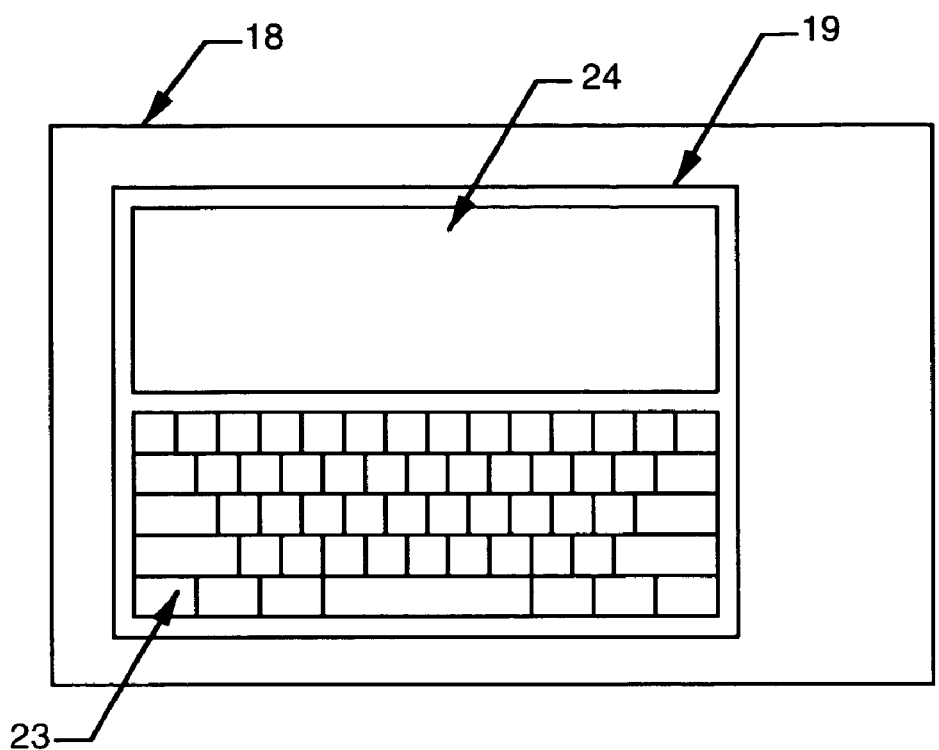
FIG. 7 illustrates the display of the device containing a keyboard layout.

One embodiment of the invention comprises the PDA 18 of FIG. 6 with an electronic touch screen keyboard, which remains invisible and only appears on a portion of the display screen when called upon by touching the keyboard icon 21. The entire display screen 19 is covered with a transparent touch panel, which is essentially a matrix array of electrodes, which can detect the location of any pressure points applied to it. The keyboard disappears when touching a minimizing icon, revealing a refreshed image of the virtual browser. When the user is viewing the image displayed by a virtual browser on the PDA, and a text message needs to be entered at a specific location on the display, the user would have to point to this specific location, and pressing on the display screen's touch panel with a stylus tip 22, the cursor appears at that exact location, ready to input text. The keyboard would then be activated by pressing on the keyboard icon 21 with a stylus tip 22, whereby a miniature keyboard layout 23 would appear at the bottom of the display screen 19 of FIG. 7, with a portion of the display screen 24 above the keyboard layout reserved to view text messages generated by the user, to be inputted in the virtual browser at a later time. As the user enters text characters by pressing on various locations of the touch panel on the keyboard layout, the text message appears in the area 24 above the keyboard, and when the user is finished inputting text, pressing on the send or return icons would send the entire text message to the host computer at the specific location on the web page, at which time the server inserts text in the text area or text box in the virtual browser. The virtual browser takes a refreshed image of the web page, rasterizes or draws it in its memory. This refreshed portion of the virtual browser is sent back to the PDA as an image, which displays the specific portion of the virtual browser that text was entered into, to verify that text was inputted at the correct location.

The pointing device may be a touch screen or tracking ball, etc. As soon as the user clicks on part of an image, the shape of the pointer changes from an arrow to an hourglass. A message is sent to the host computer, transmitting the location of the clicked down event. A program 14 of FIG. 1 interprets the message and provides a virtual click down in the virtual browser created in the translator program 4. If the user has pressed or clicked in an area of the image that does not represent a link or text box, a message is dispatched to the device which immediately changes the hourglass shape of the pointer back to an arrow (in the case of a touch screen, from an hour glass to nothing). Further to this, if the user has pressed or clicked on a part of the image which represents a link, a new Web page is extracted from the Internet or WWW, translated by translator program 4 of FIG. 1 into a bit map or raster, and compressed by compression program 11 and dispatched to the device where a new page is displayed. In a further embodiment, the image 5 of FIG. 2 may be continuously updated and translated and sent to the device where it is continuously being refreshed. This occurs once every few seconds.

In a further embodiment of the invention, an automatic keyboard feature is available to the user when scrolling through the image of the virtual browser on the PDA, and a text message is to be entered at a specific location. The user would point at the desired location to enter text and a keyboard layout 23 of FIG. 7 automatically appears ready for text input. How this happens is that a message gets sent to the host computer which knows the user has selected an area which can accept text, whereby the host responds with a message to the PDA device that it is ready to accept the keyboard entry sequence, at which time the PDA automatically pulls up the keyboard layout which appears at the bottom of the display screen 19. As text is typed, the text message appears in the area 24 above the keyboard layout, and after the send or return icons are selected, the keyboard layout disappears and the message is sent to the specific location on the virtual browser. A refreshed portion of the virtual browser is sent back to the PDA 18 as an image, which displays the specific portion of the virtual browser that text was entered into, to verify that text was inputted at the correct location.

Figure 8:
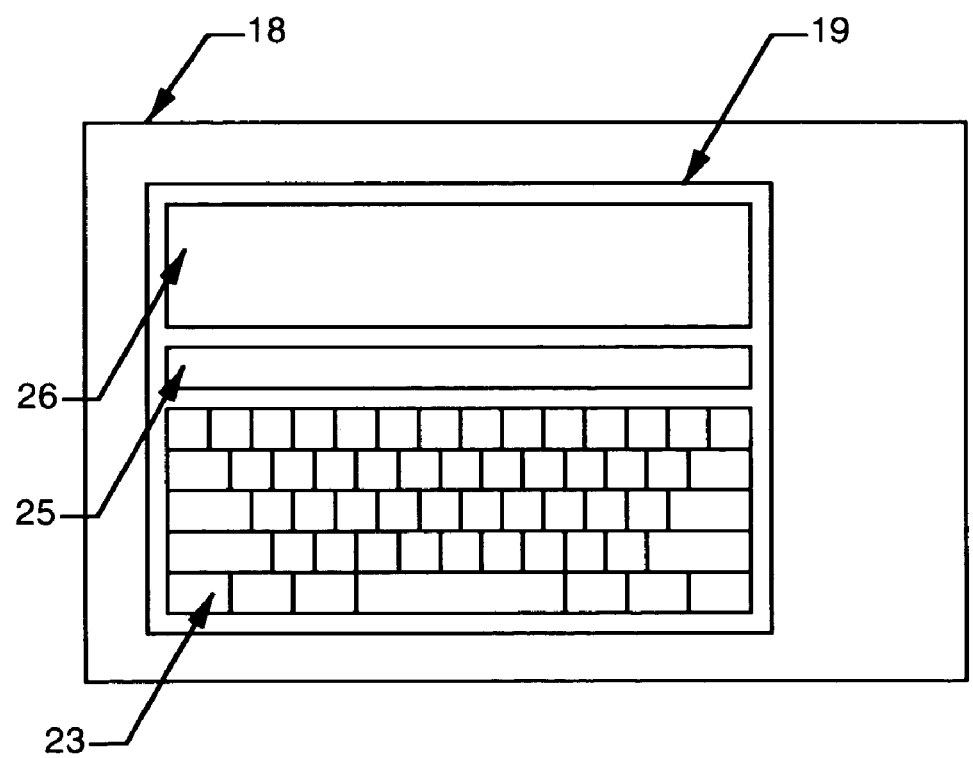
FIG. 8 illustrates the display of the device containing a keyboard layout and a text area.

In another embodiment, which communicates with the virtual browser in a similar fashion, the method of text transfer to the virtual browser is different. The display screen 19 of FIG. 8 would have the keyboard layout 23 at the bottom, with two smaller areas above, one being a text area 25 which displays text characters comprising the message being typed, and the other area 26 displaying a background portion of the virtual browser. For each text character that is selected and appears in the text area 25, a message is sent to the virtual browser 6 that tells which character is typed, and that specific text character is entered in the virtual browser in the portion of the image selected for text input. A refreshed portion of the virtual browser is sent back to the PDA 18 as an image, which displays the specific portion of the virtual browser that text was entered into, to verify that text was inputted at the correct location.

In a further embodiment, which communicates with the virtual browser in a similar fashion, the method of text transfer to the virtual browser is different. The display screen 19 of FIG. 8 would have the keyboard layout 23 at the bottom, with two smaller areas above, one is a text area 25 which displays text characters comprising the message being typed, and the other area 26 displaying a background portion of the virtual browser. For each text character that is inputted in the text area 25, a message is sent to the virtual browser 6 informing of the specific matrix location selected on the keyboard window. This matrix location is translated at the server end to determine what character is selected as the mapped layout of each character on the PDA keyboard is known, and this character entered in the virtual browser at the specific location selected. A refreshed portion of the virtual browser is sent back to the PDA 18 as an image, which displays the specific portion of the virtual browser that text was entered into, to verify that text was inputted at the correct location.

Figure 9:
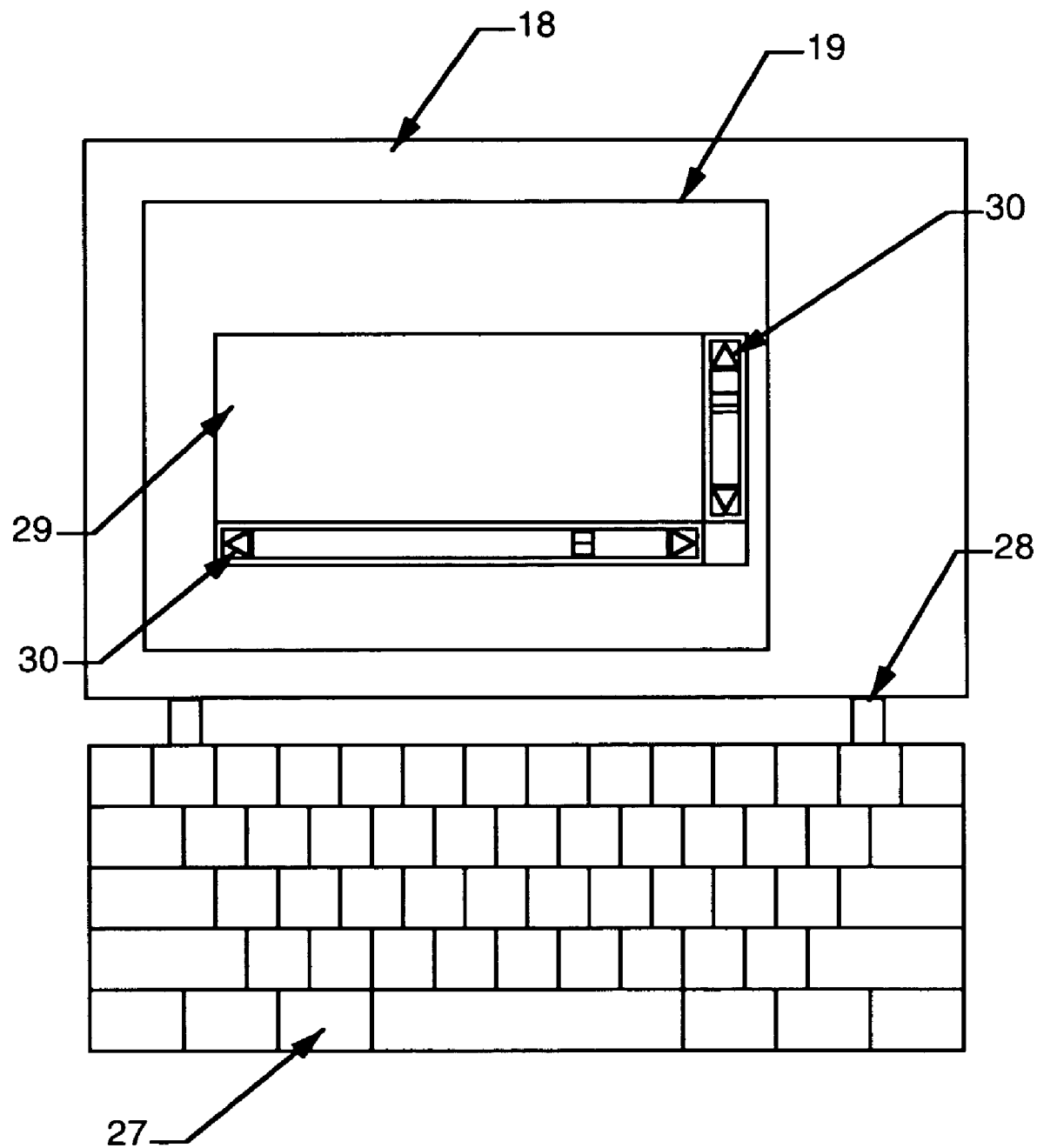
FIG. 9 illustrates the device interfaced with an external keyboard layout.
Figure 11:
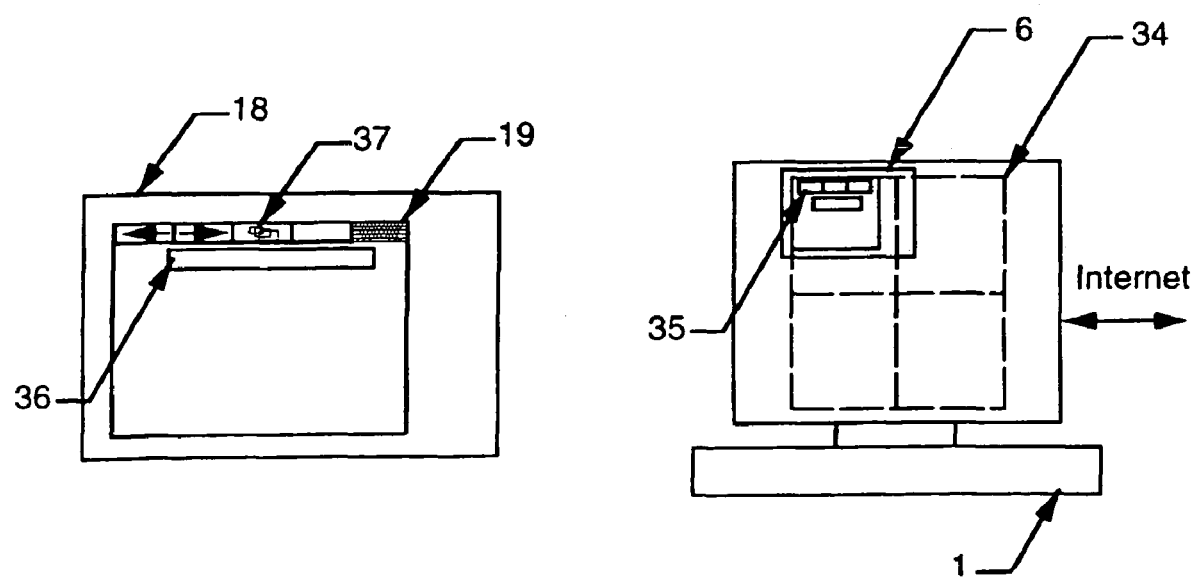
FIG. 11 illustrates icons on the device and icons on the host computer.

In another embodiment of the invention, an external keyboard 27 of FIG. 9 is featured which is used to enter text characters as required. The keyboard interface 28 can be wired or wireless. When the user wishes to enter text remotely in the virtual browser 6 (e.g., as illustrated in FIG. 11), the specific location for text entry is selected by pressing on the touch panel 19 directly over the text entry location, and a text window 29 appears in a portion of the display screen ready for text input. The text window is equipped with conventional scroll bars 30 which enable the user to have a wider viewing access, since the entire image sent from the virtual browser is decompressed and stored in the PDA 18. The keyboard connected to the PDA is then used to input text, and when the enter key is pressed, the message gets sent as a string of text characters and the text window 29 disappears. The text message is entered in the virtual browser at the specific location selected. A refreshed portion of the virtual browser is sent back to the PDA as an image, which displays the specific portion of the virtual browser that text was entered into, to verify that text was inputted at the correct location.

Figure 12:
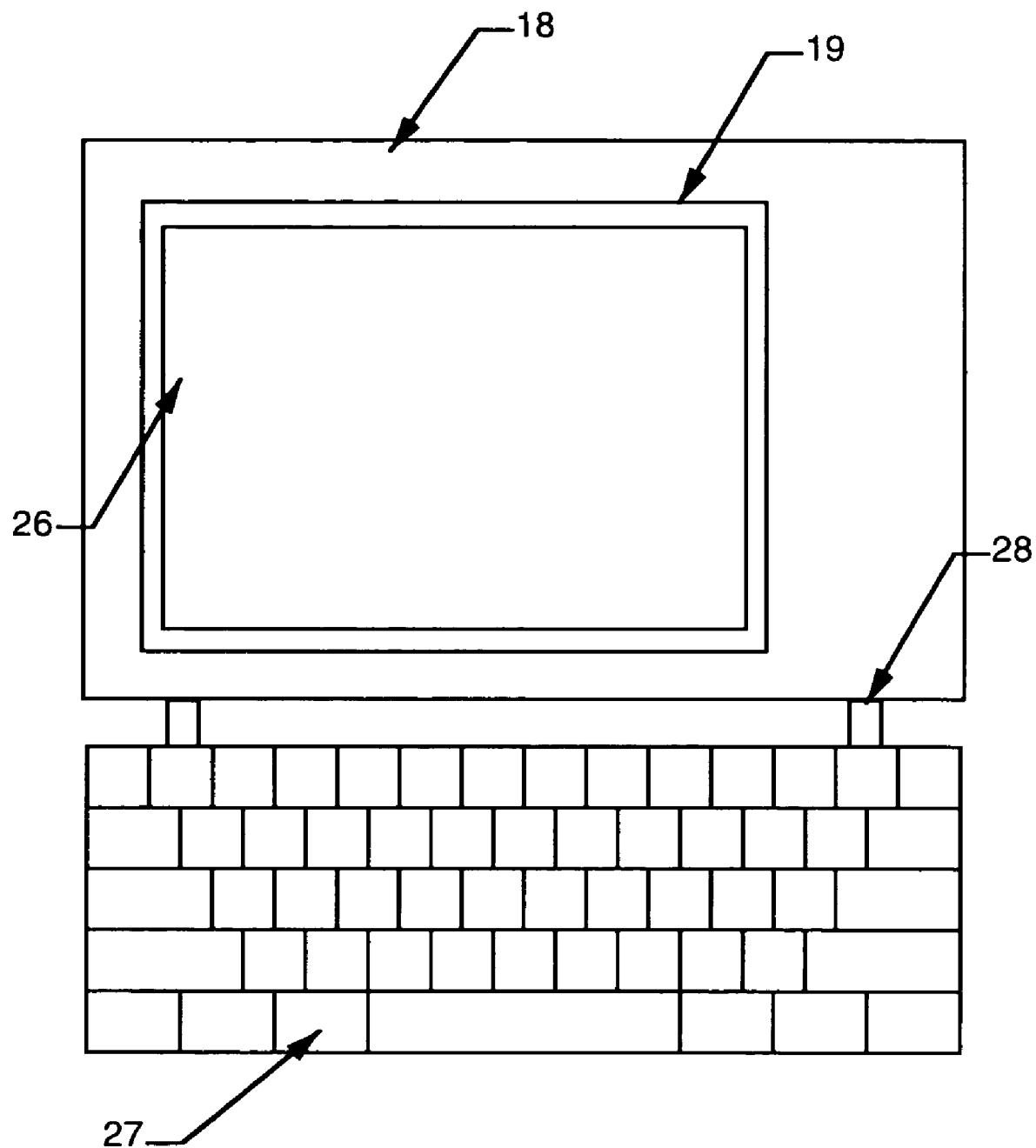
FIG. 12 illustrates a device with an external keyboard according to one embodiment of the present invention.

In a further embodiment of the invention, an external keyboard 27 of FIG. 12 is also featured which is used to enter text characters as required. The keyboard interface 28 can be wired or wireless. When the user wishes to enter text remotely in the virtual browser 6 (e.g., as illustrated in FIG. 11), the specific location for text entry is selected by pressing on the touch panel 19 of the PDA 18 directly over the text entry location. For each text character that is directly inputted through the keyboard, a message is sent to the virtual browser 6 (e.g., as illustrated in FIG. 11) that tells it which character is typed, and that specific text character is entered in the virtual browser in the portion of the image selected for text input. A refreshed portion of the virtual browser is sent back to the PDA 18 as an image, which displays (e.g., in area 26) the specific portion of the virtual browser that text was entered into, to verify that text was inputted at the correct location.

In other embodiments of the invention, the image displayed in the virtual browser is compressed at the server in various amounts by different methods before sending to the PDA device. Different parts of the image are compressed in different ways. Parts of the image that are text images are compressed by G4 compression techniques. Other parts of the image containing pictures are compressed by JPEG compression techniques. The entire image is converted to a raster image but different parts are converted at different depths of color. Text portions can be compressed by "loss less" techniques, which will result in complete image reproduction with no errors in text upon decompression, whereas pictures can be compressed by "lossy" techniques which upon decompression give a slightly degraded image quality for each compression. An image with black and white text and color graphics portions would be converted to a raster image, but only the text part of it reduced to black and white 1 bit and other graphics parts to 24 bit or other color raster images. Hence different parts of the image can be converted or reduced to different depths of color to resemble an actual web page with picture in color and text in black and white. The depths of color can be set by the user depending on the quality of image required, which affects the speed of refreshing the screen which also depends on the amount of graphics displayed. Text and pictures from a web page would get compressed separately at the server and then sent to the PDA. In the PDA, text or black and white portions of the image get decompressed first and displayed on the screen. Color portions get decompressed and are overlain in the image on the screen shortly after, enabling the user to view black and white portions of the image in advance. At the browser, the priority of decompression is determined by the depth of color, with the minimum depth being decompressed first.

A further embodiment would take the entire image to be viewed including all text and pictures and convert it to 1 bit raster. This file is compressed by G4 or other loss less compatible methods and sent to the PDA. When received by the PDA, this file is decompressed for the user to view the image, and the black and white portions are displayed first which can be done quickly and the graphics portions are overlaid progressively with color. This enables an image to be viewed quickly without the fine details of graphics, which follow moments after.

In another embodiment of the invention, the user may save and store the rasterized Web pages in the memory of the device, and therefore be able to view offline the stored rasterized pages, at a later time. The advantage of this embodiment is that the user does not have to connect to the host server to view the saved Web pages.

Figure 10:
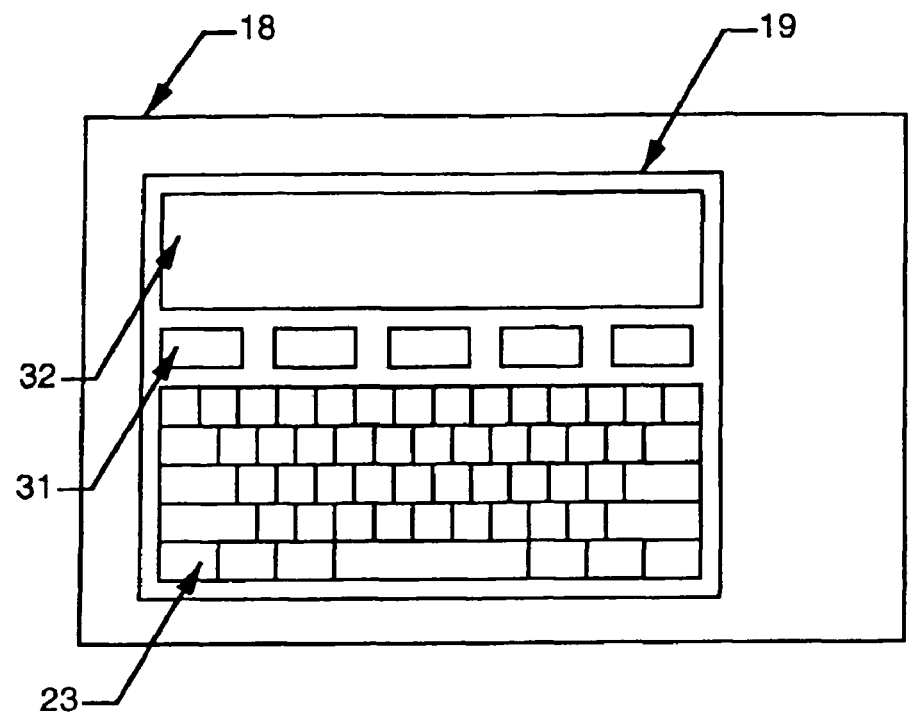
FIG. 10 illustrates the display of the device containing a keyboard layout with saved files represented by icons.

In a further related embodiment, when not connected to the server the user can generate multiple text files which are stored in internal memory on the PDA device 18 of FIG. 10, which is equipped with flash RAM, a microprocessor, and related micro electronics. This is particularly useful in creating or responding to emails or other text related documents that are lengthy and may consume a lot of time to respond to. At a later time when the user is connected to the server, which has internet connection, the user can access an email account in which emails have to be responded to, or new ones sent. The exact location where text is to be entered in the virtual browser is selected with the stylus tip and the keyboard icon selected (or the keyboard appears automatically). The keyboard layout 23 appears at the bottom of the display screen 19 and a list of all saved files is displayed above this, represented by icons 31. Pointing on each icon 31 allows the user to review each saved file in the area 32 and when the enter or send icon is pressed on the keyboard, the selected file is sent to the exact location on the virtual browser. A refreshed portion of the virtual browser is sent back to the PDA as an image, which displays the specific portion of the virtual browser that text was entered into, to verify that text was inputted at the correct location. The user can then send the file as an email or store it on the server as done conventionally.

In another embodiment of the invention, the server 1 contains the virtual browser 6 displaying part of a web page 34 such that the virtual browser contains some of the icons 35 displayed in the display screen 19 of the PDA 18, as illustrated in FIG. 11. These icons on the virtual browser may not be the same icons in the display screen of the PDA, but there are different ways to communicate between the PDA icons and the virtual browser's icons in conjunction with menu driven commands. The PDA may contain more icons than displayed on the virtual browser, so that an icon selected on the PDA screen may represent a command on the virtual browser not represented by an icon. In this particular embodiment, the PDA does the translation of which command is executed when a stylus is used to select an icon on the display screen's touch panel, and a message is sent to the virtual browser to execute that command at specific locations on the virtual browser. For example, pressing the "back" icon on the PDA 18 is translated by the PDA and this command linked to the "back" icon on the virtual browser 6, which can be in a different location. The PDA contains in its memory a mapped location address of all icons and menu commands on the server, so when an icon is selected on the display screen of the PDA, the PDA would link to the appropriate command or commands on the server, which are immediately executed. A single command executed from the PDA 18 can also represent a sequence of commands on both the PDA and the virtual browser 6. For example, when the address icon is selected on the PDA 18 a text box 36 appears below and the keyboard automatically appears on the PDA display screen 19, ready to input data into the text box. The PDA 18 would link the address in the text box 36 to the address box on the virtual browser and all text entered on the PDA gets inputted on the virtual browser. A single command executed from the PDA 18 can also be linked to menu driven commands on the virtual browser 6. For example, when the user wishes to change the font size on the PDA display screen which may not always be suitable for a variety of users, the font size icon 37 is selected from the display screen 19 and a link is made to pre-selected font sizes on the menu items on the server. Hence, selecting the font size icon on the PDA screen would change the size of the font displayed on both the server and the PDA. Repeatedly selecting the font size icon takes the user progressively through all the pre-selected font sizes.

In another related embodiment, the server 1 of FIG. 11 does all the translation of commands executed by the PDA 18 of the invention. Hence, the server has a mapped location of all icons on the PDA display screen 19. When a command is executed by pressing on the touch screen of the PDA, a message is sent to the server informing of the specific location selected. The server would translate this location to a command as intended by the user. A refreshed portion of the virtual browser is sent back to the PDA 18 as an image.

In another embodiment of the present invention, images are only refreshed when an event occurs such as a mouse down event on a link or in a text box.

In a further embodiment only those portions of the image that changes may be transmitted from the host computer to the PDA device. Other images in the virtual browser that are continuously changing, such as banner advertisements, may be the only other images sent to the PDA device as they change.

The PDA device only contains enough memory to store the current displayable page. When the user presses a back or forward button, a message is sent to the host server, and the host server sends the reference page. The back and forward buttons etc. may be hard wired into the PDA device, or may be part of the display area.

Further to this, parts of the image representing buttons (and other elements) on the virtual browser may be sent as part of the compressed image and buttons such as forward and back may be treated the same way as links are handled as previously described. In the principle embodiment therefore the back and forward buttons are hard coded as part of the device.

In another embodiment, the PDA device comprises a modem that permits the device to connect to a cellular telephone in digital format.

In another embodiment, the connection to the cellular telephone is made through an analog modem connected to an ear jack of the cellular telephone.

In yet another embodiment of the present invention, the modem is replaced by an analog modem that has the capability to be connected to a landline providing a standard 56 kbps-type connection.

Further embodiments may provide connections through ISDN, cable modems etc.

In a further embodiment, the PDA device may contain a large screen to be used in a fashion similar to a home Internet appliance.

The invention has been described in detail with particular reference to the preferred embodiments thereof, but it will be understood that variations and modifications can be effected within the spirit and scope of the invention.

I claim:

1. A method implemented on a server to serve documents, the method comprising:

receiving, at the server from a remote device, a request for a document, the document including text and one or more links;

transmitting, from the server, a request over a network to have the document delivered to the server and receiving the document, at the server, in response to the request transmitted from the server;

rendering, at the server and for displaying on a screen attached to the remote device, an image of the entire document in response to the request, the image being larger than a screen area on the remote device available for displaying the document, the image including non-linkable graphical representations of the one or more links; and sending, from the server to the remote device, a portion of the image in a compressed format as a response to the request for the document; and receiving, at the server from the remote device, a message to indicate a location of a user input being received at the remote device relative to a location on the portion of the image displayed in the screen area.

2. The method of claim 1, wherein the document is retrieved from the Internet by the server in response to the request for the document from the remote device.

3. The method of claim 1, further comprising:

receiving, at the server from the remote device, a message to indicate a text input, the text input being received at the remote device relative to a location on the portion of the image displayed in the screen area;

entering, at the server, the text input into the document at a location corresponding to the location on the portion of the image displayed in the screen area to render a refreshed portion of the image; and sending, from the server to the remote device, the refreshed portion of the image.

4. The method of claim 3, wherein the text input is received at the remote device from a touch screen keyboard; the message includes one or more matrix locations selected on the touch screen keyboard; and, the method further comprises:

determining, at the server, one or more text characters from the one or more matrix locations to enter the text characters into the document.

5. The method of claim 3, further comprising:

sending, from the server to the remote device, a message to accept keyboard entry in response to a determination that the document accepts text input at the location corresponding to the location on the portion of the image displayed on the screen.

6. The method of claim 5, wherein the message to accept keyboard entry causes the remote device to display a keyboard layout on the remote device.

7. The method of claim 1, wherein the image is in a plurality of sections rendered from the document; a first one of the plurality of sections is compressed in a first format; and, a second one of the plurality of sections is compressed in a second format.

8. The method of claim 7, wherein the first format is lossless; and, the second format is lossy.

9. The method of claim 8, wherein the first one of the plurality of sections is rendered from a text portion of the document; and, the second one of the plurality of sections is rendered from a graphics portion of the document.

10. The method of claim 7, wherein the first one of the plurality of sections and the second one of the plurality of sections have different color depths.

11. The method of claim 1, wherein the image rendered from the document comprises:

a first layer in a reduced color depth; and one or more graphics portions with fine details to be overlaid over the first layer.

12. The method of claim 11, wherein the first layer is monochrome.

13. A method as in claim 1 wherein the rendering at the server renders display pixels to be displayed at the remote device such that the remote device does not render display pixels.

14. A method implemented on a portable device to access remote documents, the method comprising:

sending, from the device to a remote server, a request for a document, the document having vector information including text the request causing the remote server to transmit a further request over a network to have the document delivered to the remote server so that the remote server can render the image;

receiving, at the device, an image in a compressed format from the remote server, the image being rendered at the remote server from the entire document in response to the request, the image including a non-linkable graphical representation of at least one link;

storing the image in the compressed format on the device;

according to a user input to the device, selectively displaying only a portion of the image on a screen attached to the device according to the image stored on the device; and receiving, at the device, a user input of a location on the portion of the image displayed on the screen;

transmitting, from the device to the remote server, a message to indicate the location of a user input relative to the location on the portion of the image displayed on the screen.

15. The method of claim 14, wherein the image comprises a plurality of sections; a first section of the plurality of sections that is not displayed on the device remains compressed on the device while one or more sections of the plurality of sections corresponding to the portion of the image displayed on the device are decompressed.

16. The method of claim 14, wherein said selectively displaying the portion of the image comprises:

scrolling the image on the screen at exclusive control of the device.

17. The method of claim 14, further comprising:

receiving, at the device, a text input relative to a location on the portion of the image displayed on the screen;

sending, from the device to the remote server, a message to indicate that the text input is to be entered into the document;

receiving, at the device from the remote server, a refreshed portion of the image, the refreshed portion of the image being rendered at the remote server after entering the text input into the document at a location corresponding to the location on the portion the image displayed on the screen; and displaying the refreshed portion of the image on the screen.

18. The method of claim 17, wherein the text input comprises a string of text characters; and, the message is sent from the device to the remote server in response to receiving, at the device, a command to send.

19. The method of claim 18, wherein the text input is received at the device through one or more selections on a keyboard layout displayed on the screen; and, the command to send causes the keyboard layout not being displayed on the screen.

20. The method of claim 17, wherein the text input is a single text character; and, the message is sent from the device to the remote server in response to receiving, at the device, the single text character.

21. The method of claim 17, wherein the text input is received at the device from a touch screen keyboard; the message includes one or more matrix locations selected on the touch screen keyboard; and, the remote server determines one or more text characters from the one or more matrix locations to enter the text characters into the document.

22. The method of claim 17, further comprising:
receiving, at the device from the remote server, a message to accept keyboard entry when the remote server determines that the document accepts text input at the location corresponding to the location on the portion of the image displayed on the screen; and
displaying a keyboard layout on the screen in response to the message to accept keyboard entry.

23. The method of claim 14, further comprising:
receiving text inputs at the device;
storing text characters in a text file on the device according to the text inputs;
retrieving the text characters from the text file; and
sending, from the device to the remote server, a message to enter the text characters into the document on the remote server at a location corresponding to a location on a portion of the image displayed on the screen.

24. The method of claim 23, wherein the text inputs are received while the device is not in communication with the remote server.

25. The method of claim 23, wherein the text inputs comprise an electronic mail message; and, the document comprises a web page for sending the electronic mail message.

26. The method of claim 14, further comprising:
retrieving at least a portion of an image of a previously requested document from a memory of the device, the image of the previously requested document being previously received from the remote server and stored in the memory of the device in a compressed format; and
displaying at least the portion of the image of the previously requested document.

27. The method of claim 14, wherein the image rendered from the document is received at the device in a plurality of sections; a first one of the plurality of sections is compressed in a first format; and, a second one of the plurality of sections is compressed in a second format.

28. The method of claim 27, wherein the first format is lossless; and, the second format is lossy.

29. The method of claim 28, wherein the first one of the plurality of sections is rendered from a text portion of the document; and, the second one of the plurality of sections is rendered from a graphics portion of the document.

30. The method of claim 27, wherein the first one of the plurality of sections and the second one of the plurality of sections have different color depths.

31. The method of claim 30, wherein the device decompresses sections of the image for display on the screen in a priority according to color depth.

32. The method of claim 14, wherein the image rendered from the document comprises:
a first layer in a reduced color depth; and
one or more graphics portions with fine details to be overlaid over the first layer;
wherein the first layer is decompressed for display on the screen before the graphics portions are decompressed.

33. The method of claim 32, wherein the first layer is monochrome.

34. The method of claim 14, further comprising:
displaying a plurality of icons with at least a portion of the image on the screen; and
responsive to receiving a selection of one of the plurality of icons, transmitting from the device to the remote server a message to execute a command with respect to the document at the remote server.

35. The method of claim 34, further comprising:
determining at the device one or more commands from the selection;
wherein the message comprises the one or more commands.

36. The method of claim 34, wherein the message comprises information about the selection; and, the remote server determines the command from the information about the selection.

37. A method as in claim 14 wherein the remote server renders display pixels to be displayed at the device such that the device does not render display pixels.

38. A machine readable medium containing executable computer program instructions which when executed by a data processing system cause said system to perform a method implemented on a server to serve documents, the method comprising:
transmitting, from the server, a request over a network to have the document delivered to the server and receiving the document, at the server, in response to the request transmitted from the server;
receiving, at the server from a remote device, a request for a document, the document including text and one or more links;
rendering, at the server and for displaying on a screen attached to the remote device, an image of the entire document in response to the request, the image being larger than a screen area on the remote device available for displaying the document, the image including non-linkable graphical representations of the one or more links;
sending, from the server to the remote device, a portion of the image in a compressed format as a response to the request for the document; and
receiving, at the server from the remote device, a message to indicate a location of a user input being received at the remote device relative to a location on the portion of the image displayed in the screen area.

39. The medium of claim 38, further comprising:
receiving, at the server from the remote device, a message to indicate a text input, the text input being received at the remote device relative to a location on the portion of the image displayed in the screen area;
entering, at the server, the text input into the document at a location corresponding to the location on the portion of the image displayed in the screen area to render a refreshed portion of the image; and
sending, from the server to the remote device, the refreshed portion of the image.

40. The medium of claim 39, further comprising:
sending, from the server to the remote device, a message to accept keyboard entry in response to a determination that the document accepts text input at the location corresponding to the location on the portion of the image displayed on the screen.

41. The medium of claim 38, wherein the image is in a plurality of sections rendered from the document; a first one of the plurality of sections is compressed in a first format; and, a second one of the plurality of sections is compressed in a second format.

42. The medium of claim 41, wherein the first format uses a lossless technique; and, the second format uses a lossy technique.

43. The medium of claim 41, wherein the first one of the plurality of sections and the second one of the plurality of sections have different color depths.

44. The medium of claim 38, wherein the image rendered from the document comprises:
   a first layer in a reduced color depth; and
   one or more graphics portions with fine details to be overlaid over the first layer.

45. A medium as in claim 38 wherein the rendering at the server renders display pixels to be displayed at the remote device such that the remote device does not render display pixels.

46. A machine readable medium containing executable computer program instructions which when executed by a data processing system cause said system to perform a method implemented on a portable device to access remote documents, the method comprising:
   sending, from the device to a remote server, a request for a document, the document having vector information including text the request causing the remote server to transmit a further request over a network to have the document delivered to the remote server so that the remote server can render the image;
   receiving, at the device, an image in a compressed format from the remote server, the image being rendered at the remote server from the entire document in response to the request, the image including a non-linkable graphical representation of at least one link;
   storing the image in the compressed format on the device;
   according to a user input to the device, selectively displaying only a portion of the image on a screen attached to the device according to the image stored on the device; and
   receiving, at the device, a user input of a location on the portion of the image displayed on the screen;
   transmitting, from the device to the remote server, a message to indicate the location of the user input relative to the location on the portion of the image displayed on the screen.

47. The medium of claim 46, wherein the image comprises a plurality of sections; a first section of the plurality of sections that is not displayed on the device remains compressed on the device while one or more sections of the plurality of sections corresponding to the portion of the image displayed on the device are decompressed.

48. The medium of claim 46, wherein said selectively displaying the portion of the image comprises:
   scrolling the image on the screen at exclusive control of the device.

49. The medium of claim 46, further comprising:
   receiving, at the device, a text input relative to a location on the portion of the image displayed on the screen;
   sending, from the device to the remote server, a message to indicate that the text input is to be entered into the document;
   receiving, at the device from the remote server, a refreshed portion of the image, the refreshed portion of the image being rendered at the remote server after entering the text input into the document at a location corresponding to the location on the portion the image displayed on the screen; and
   displaying the refreshed portion of the image on the screen.

50. The medium of claim 49, further comprising:
   receiving, at the device from the remote server, a message to accept keyboard entry when the remote server determines that the document accepts text input at the location corresponding to the location on the portion of the image displayed on the screen; and
   displaying a keyboard layout on the screen in response to the message to accept keyboard entry.

51. The medium of claim 46, further comprising:
   receiving text inputs at the device;
   storing text characters in a text file on the device according to the text inputs;
   retrieving the text characters from the text file; and
   sending, from the device to the remote server, a message to enter the text characters into the document on the remote server at a location corresponding to a location on a portion of the image displayed on the screen.

52. The medium of claim 46, further comprising:
   retrieving at least a portion of an image of a previously requested document from a memory of the device, the image of the previously requested document being previously received from the remote server and stored in the memory of the device in a compressed format; and
   displaying at least the portion of the image of the previously requested document.

53. The medium of claim 46, wherein the image rendered from the document is received at the device in a plurality of sections; a first one of the plurality of sections is compressed in a first format; and, a second one of the plurality of sections is compressed in a second format.

54. The medium of claim 53, wherein the first format uses a lossless technique; and, the second format uses a lossy technique.

55. The medium of claim 54, wherein the first one of the plurality of sections is rendered from a text portion of the document; and, the second one of the plurality of sections is rendered from a graphics portion of the document.

56. The medium of claim 53, wherein the first one of the plurality of sections and the second one of the plurality of sections have different color depths.

57. The medium of claim 56, wherein the device decompresses sections of the image for display on the screen in a priority according to color depth.

58. The medium of claim 46, wherein the image rendered from the document comprises:
   a first layer in a reduced color depth; and
   one or more graphics portions with fine details to be overlaid over the first layer;
   wherein the first layer is decompressed for display on the screen before the graphics portions are decompressed.

59. The medium of claim 46, further comprising:
   displaying a plurality of icons with at least a portion of the image on the screen; and
   responsive to receiving a selection of one of the plurality of icons, transmitting from the device to the remote server a message to execute a command with respect to the document at the remote server.

60. A medium as in claim 46 wherein the remote server renders display pixels to be displayed at the device such that the device does not render display pixels.

61. A server to serve documents, the server comprising:

means for receiving, at the server from a remote device, a request for a document, the document including text and one or more links;

transmitting, from the server, a request over a network to have the document delivered to the server and receiving the document, at the server, in response to the request transmitted from the server;

means for rendering, at the server and for displaying on a screen attached to the remote device, an image from of the entire document in response to the request, the image being larger than a screen area on the remote device available for displaying the document, the image including non-linkable graphical representations of the one or more links;

means for sending, from the server to the remote device, a portion of the image in a compressed format as a response to the request for the document; and receiving, at the server from the remote device, a message to indicate a location of a user input being received at the remote device relative to a location on the portion of the image displayed in the screen area.

62. The server of claim 61, further comprising:

means for receiving, at the server from the remote device, a message to indicate a text input, the text input being received at the remote device relative to the location on a portion of the image displayed in the screen area;

means for entering, at the server, the text input into the document at a location corresponding to the location on the portion of the image displayed in the screen area to render a refreshed portion of the image; and means for sending, from the server to the remote device, the refreshed portion of the image.

63. The server of claim 62, further comprising:

means for sending, from the server to the remote device, a message to accept keyboard entry in response to a determination that the document accepts text input at the location corresponding to the location on the portion of the image displayed on the screen.

64. The server of claim 61, wherein the image is in a plurality of sections rendered from the document; a first one of the plurality of sections is compressed in a first format; and, a second one of the plurality of sections is compressed in a second format.

65. The server of claim 64, wherein the first format is lossless; and, the second format is lossy.

66. The server of claim 64, wherein the first one of the plurality of sections and the second one of the plurality of sections have different color depths.

67. The server of claim 61, wherein the image rendered from the document comprises:

a first layer in a reduced color depth; and one or more graphics portions with fine details to be overlaid over the first layer.

68. A portable device to access remote documents, the device comprising:

means for sending, from the device to a remote server, a request for a document, the document having vector information including text the request causing the remote server to transmit a further request over a network to have the document delivered to the remote server so that the remote server can render the image;

means for receiving, at the device, an image in a compressed format from the remote server, the image being rendered at the remote server from the entire document in response to the request, the image including a non-linkable graphical representation of at least one link;

means for storing the image in the compressed format on the device; and means for, according to a user input to the device, selectively displaying only a portion of the image on a screen attached to the device according to the image stored on the device;

means for receiving, at the device, a user input of a location on the portion of the image displayed on the screen; and means for transmitting, from the device to the remote server, a message to indicate the location of a user input relative to the location on the portion of the image displayed on the screen.

69. The device of claim 68, wherein the image comprises a plurality of sections; a first section of the plurality of sections that is not displayed on the device remains compressed on the device while one or more sections of the plurality of sections corresponding to the portion of the image displayed on the device are decompressed.

70. The device of claim 68, wherein said means for selectively displaying the portion of the image comprises:

means for, scrolling the image on the screen at exclusive control of the device.

71. The device of claim 68, further comprising:

means for receiving, at the device, a text input relative to a location on the portion of the image displayed on the screen;

means for sending, from the device to the remote server, a message to indicate that the text input is to be entered into the document;

means for receiving, at the device from the remote server, a refreshed portion of the image, the refreshed portion of the image being rendered at the remote server after entering the text input into the document at a location corresponding to the location on the portion the image displayed on the screen; and means for displaying the refreshed portion of the image on the screen.

72. The device of claim 71, further comprising:

means for receiving, at the device from the remote server, a message to accept keyboard entry when the remote server determines that the document accepts text input at the location corresponding to the location on the portion of the image displayed on the screen; and means for displaying a keyboard layout on the screen in response to the message to accept keyboard entry.

73. The device of claim 68, further comprising:

means for receiving text inputs at the device;

means for storing text characters in a text file on the device according to the text inputs;

means for retrieving the text characters from the text file; and means for sending, from the device to the remote server, a message to enter the text characters into the document on the remote server at a location corresponding to a location on a portion of the image displayed on the screen.

74. The device of claim 68, further comprising:

means for retrieving at least a portion of an image of a previously requested document from a memory of the device, the image of the previously requested document being previously received from the remote server and stored in the memory of the device in a compressed format; and means for displaying at least the portion of the image of the previously requested document.

75. The device of claim 68, wherein the image rendered from the document is received at the device in a plurality of sections; a first one of the plurality of sections is compressed in a first format; and, a second one of the plurality of sections is compressed in a second format.

76. The device of claim 75, wherein the first format is lossless; and, the second format is lossy.

77. The device of claim 76, wherein the first one of the plurality of sections is rendered from a text portion of the document; and, the second one of the plurality of sections is rendered from a graphics portion of the document.

78. The device of claim 75, wherein the first one of the plurality of sections and the second one of the plurality of sections have different color depths.

79. The device of claim 78, wherein the device decompresses sections of the image for display on the screen in a priority according to color depth.

80. The device of claim 68, wherein the image rendered from the document comprises:

a first layer in a reduced color depth; and one or more graphics portions with fine details to be overlaid over the first layer;

wherein the first layer is decompressed for display on the screen before the graphics portions are decompressed.

81. The device of claim 68, further comprising:

means for displaying a plurality of icons with at least a portion of the image on the screen; and means for, responsive to receiving a selection of one of the plurality of icons, transmitting from the device to the remote server a message to execute a command with respect to the document at the remote server.

* * * * *